US005262615A

United States Patent [19]

Hancock

[11] Patent Number: 5,262,615

[45] Date of Patent: Nov. 16, 1993

[54] FILM RESISTOR MADE BY LASER TRIMMING

[75] Inventor: Peter G. Hancock, Plano, Tex.

[73] Assignee: Honeywell Inc., Minneapolis, Minn.

[21] Appl. No.: 787,858

[22] Filed: Nov. 5, 1991

[51] Int. Cl.⁵ ............ B23K 26/00

[52] U.S. Cl. ............ 219/121.69; 338/195

[58] Field of Search ............ 219/121.71, 121.68, 219/121.7, 121.69, 121.78, 121.79; 338/195

[56] References Cited

U.S. PATENT DOCUMENTS

| | | | |
|---|---|---|---|
| 4,041,440 | 8/1977 | Davis et al. | 338/195 |
| 4,097,988 | 7/1978 | Hauschild | 219/121.69 X |
| 4,159,461 | 6/1979 | Kost et al. | 338/155 |
| 5,081,439 | 1/1992 | Natzle et al. | 338/195 |

FOREIGN PATENT DOCUMENTS

| | | |
|---|---|---|
| 2337466 | 2/1975 | Fed. Rep. of Germany . |

*Primary Examiner*—C. L. Albritton
*Attorney, Agent, or Firm*—William D. Lanyi

[57] ABSTRACT

A trimmable resistor is provided which can be trimmed with a single movement of a laser beam without requiring intermitted deenergizations of the beam accompanied by measurements of the resistance to determine additional material removal steps. The procedure of the present invention begins the material removal at a location within the body of the resistor and displaced from all edges of the resistor body by a predetermined amount. The energization of the laser immediately begins to remove material at its initial location and, as the laser is moved to a second location, a single cut is made to calibrate the resistor wherein the entire cut is located within the body of the resistor and no part of the cut intersects any edge of the resistor body. The length of the cut is calculated prior to initiation of the trimming procedure and the technique of the present invention permits the movement of the laser beam to be precisely made without positioning error being induced by the normal initiation point which is located outside of the body of the resistor in trimming techniques known to those skilled in the art.

6 Claims, 1 Drawing Sheet

PRIOR ART

FILM RESISTOR MADE BY LASER TRIMMING

BACKGROUND OF THE INVENTION

1. Field of the Invention

The present invention relates to film resistors which are trimmed to set the resistance value of the resistor to a predetermined value and, more particularly, to thick or thin film resistors which are laser trimmed to remove a portion of the resistor body within and displaced from the edges of the resistor body.

2. Description of the Prior Art

Many methods for trimming film resistors are well known to those skilled in the art. The use of a laser has significantly improved the accuracy of the laser trimming procedure and has significantly reduced the time necessary to perform the calibration process.

German Patent 23-37-466, which issued in 1975, illustrates several different configurations of film resistors with material removed along a cut portion. All of the cut portions shown in this patent intersect an edge of the film resistor body, indicating that if a laser was used to perform the material removal operation the laser was initially energized at or outside an edge of the film resistor body. This technique is generally similar to those which will be described below.

U.S. Pat. No. 4,097,988, which issued to Hauschild on Jul. 4, 1978, discloses a method of manufacturing thick film resistors to precise electrical values. The resistance material is applied to a substrate in a layer which has a configuration that tapers in a direction that is transverse to the direction of flow of current. Conductive leads are provided in contact with the tapered edges of the layer. An incision on the shorter side of the layer, between the tapering edges to which the leads are applied, will have a relatively large effect on the resistance value without having a significant affect on the amount of the area that determines the power rating of the resistor. Therefore, trimming by such an incision can be done quickly and the resistance change with progressive incision is more uniform than in the case of a resistor layer of rectangular configuration.

U.S. Pat. No. 4,159,461, which issued to Kost et al on Jun. 26, 1979, describes a resistor network having extended trim ratio and improved trimming and operating characteristics. The resistor network comprises an insulated substrate which has at least one film resistor formed on it and a pair of opposed film conductor electrodes disposed on opposite side of the film resistor. Side edges of the film resistor are engaged by film conductor electrodes and flare outwardly from the bottom edge of the film resistor to terminate a dome shaped top region that is elongated and semicylindrical in configuration. The dome shaped top region is not engaged by the film conductor electrodes and the film resistor is trimmed by removal of a notch from the film resistor starting from the bottom edge and extending upwardly along the line substantially centered beneath the apex of the dome.

U.S. Pat. No. 4,041,440, which issued to Davis et al on Aug. 9, 1977, describes a method of adjusting resistance of thick film thermistor. The thermistor-resistor network disclosed in this patent is functionally adjusted and has an accurately preselected electrical resistance and preselected change of electrical resistance as a function of temperature. The network features a thermistor and/or a conductor segment contacting the thermistor having plurality of parallel paths. Some of the paths preferably provide a different resistance change with temperature than the other paths. A selected number of the parallel paths are severed during functional testing to adjust the thermistor to a preselected change in network resistance with change in temperature. The resistor is functionally adjusted in the usual manner to obtain the selected total network resistance value at room temperature.

One particular method of performing a laser trimming operation on a film resistor is to direct the laser beam at a position outside the resistor body, but at a known distance from a preselected edge of the resistor body. The laser is typically energized when the beam is pointing at this first position and, after energization, the laser beam is moved toward the resistor body to remove material from the laser body along the path traveled by the laser beam. The material removed from the film resistor body is typically equal to a width determined by the diameter of the laser beam. As the laser continues to move inward from the edge of the resistor body, more material is removed. At any point during this procedure, the laser can be deenergized and the effective resistance of the film resistor can be measured empirically to determine the necessity for further trimming. If the resistance is lower than desired, the laser can be reenergized and the movement of the laser beam can be continued from the position at which it was stopped during the measurement operation. After further movement and further removal of resistor material, the laser can again be deenergized to permit the resistance to again be measured. This procedure can be repeated until the proper resistance value is achieved. This start and stop process is sometimes referred to as "nibbling" with the overall procedure sometimes requiring numerous deenergizations of the laser and measurements of the resistor to achieve the appropriate resistance value.

A slightly modified technique also begins with the laser beam directed to a point outside the body of the resistor. However, the required travel of the laser beam is precalculated and theoretically determined prior to energization of the laser and movement of its beam. The laser beam is energized when the beam is directed at a position which is outside the body of the film resistor. The distance from the beam to the nearest edge of the resistor is known, within the limitations imposed by the equipment and operational tolerances. The required length of the cut to the resistor body is theoretically calculated and the distance of travel of the laser beam is therefore generally equivalent to the sum of the length of the material removal cut and the distance between the original position of the laser and the edge of the resistor body. This theoretical approach provides a significant improvement over the "nibbling" technique described above, but several serious problems remain.

When the laser is used to trim a film resistor body in the manner described immediately above, it is necessary that the original position of the laser and its distance from the resistor body edge be known with a high degree of accuracy. If this dimension varies from its assumed value, the length of the cut made by the laser into the resistor body will vary and, therefore, the resistance of the film resistor will vary. For example, if the original position of the laser beam is farther from the nearest edge than anticipated the overall travel of the laser beam will result in a cut in the resistor body which is shorter than expected. On the other hand, if the original position of the laser beam is closer to the nearest edge of the resistor body than expected, the predetermined travel of the laser will result in a cut in the resistor body which is longer than expected. Because of this uncertainty, the first pass of the laser must be slightly shorter than the mathematically calculated length. This prevents the possibility that the cut be made too long on the first pass since this type of error is not correctable. Therefore, after an initial pass by the laser beam, to a position shorter than actually desired, the laser can be deenergized and the resistance of the resistor can be empirically determined by measurement so that the second energized travel of the laser can be mathematically calculated with a high degree of accuracy. However, because of the uncertainty in the initial position of the laser, a minimum of two steps is required to perform this technique.

It would therefore be advantageous if a laser trimming procedure could be developed which permits the resistor to be accurately trimmed with a high degree of confidence but requiring only a single energization and deenergization of the laser and a single episode of travel to perform this function.

SUMMARY OF THE INVENTION

The present invention provides a film resistor that is trimmed by a highly efficient process that can be performed with a single energization and deenergization of a laser and a single pass by the laser from a first position to a second position within the body of the film resistor. A resistor made in accordance with the present invention has a body, made of a resistive material, which is trimmed by removing a portion of the resistive material along a cut which extends from the first position to the second position and which does not intersect any edge of the resistor body.

By beginning the cut at a position within the body of the resistor and displaced from any edge of the film resistor, the present invention eliminates the error which could possibly be caused by an erroneous positioning of the laser at an initial position outside of the resistor body. By beginning the laser travel at a position within the body of the resistor, no part of the laser beam's energized path is outside the resistor body. Therefore, all the laser beam travel is effective in removing material from the resistor and, since the laser beam travel can be controlled with a very high degree of accuracy, the length of the cut in the resistor body is highly accurate and predictable. This permits the required length of cut to be mathematically determined prior to the trimming operation and be accomplished with a high degree of accuracy. A resistor made in accordance with the present invention can be easily recognized by the absence of any part of the trimming cut extending in interfering relation with an edge of the resistor body. All the removed material is removed from the central portion of the resistor body at a location which is displaced inwardly from all edges of the resistor body.

BRIEF DESCRIPTION OF THE DRAWINGS

The present invention will be more fully understood from a reading of the Description of the Preferred Embodiment in association with the drawings, in which.

DESCRIPTION OF THE PREFERRED EMBODIMENT

Figure 1:
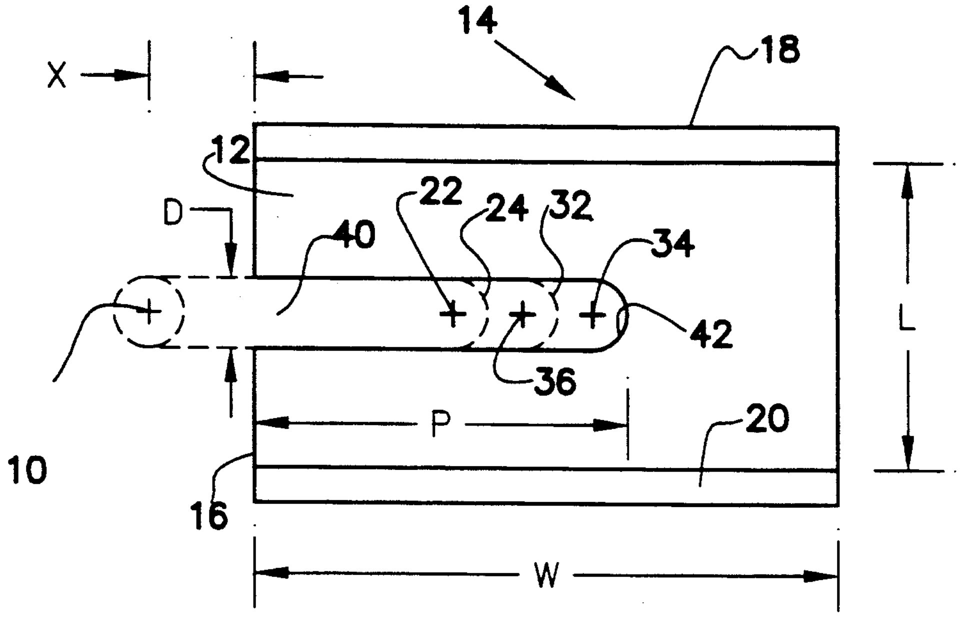
FIG. 1 shows a film resistor made in accordance with techniques known in the prior art.

Throughout the Description of the Preferred Embodiment, like components and elements will be identified with like reference numerals.

FIG. 1 illustrates a resistor trimming technique known to those skilled in the art. A laser beam is directed to a first position which is identified by a circular area around center point 10. This location is outside the body 12 of the film resistor, which is generally identified by reference numeral 14. As can be seen in FIG. 1, the center point 10 of the initial position of the laser beam is displaced from an edge 16 by a distance identified by reference letter X.

From the initial position 10, the laser beam is energized and moved toward the right in FIG. 1 until it begins to remove material at edge 16 after having traveled a distance equivalent to $X-\Delta/2$. The laser then continues to move toward the right in FIG. 1 and continues to remove material from the body 12 of the film resistor 14. During this procedure, the laser is typically stopped at some point in its travel so that the resistance between connection point 18 and connection point 20 can be measured. For purposes of illustration, the first stopping position is identified by reference numeral 20 in FIG. 1 and the end surface of the cut made by the laser at this first stopping point is identified by dashed line 24. After the resistance between connectors 18 and 22 is measured, the laser is reenergized an moved toward the right if the resistance of the film resistor 14 is less than the desired value. For example, the laser could be moved toward the right in FIG. 1 until it reaches point 30 which would remove all the material to the left of dashed line 32 in FIG. 1. Once again, the resistance between connectors 18 and 20 would be measured after deenergization of the laser. If the resistance of the film resistor 14 is still lower than the desired value, the laser would be reenergized and would continue to be moved toward the right until eventually it reached point 34 to define a material removal cut generally identified by reference numeral 40 and extending from edge 16 to surface 42.

An improvement to the above described technique would incorporate the precalculation of a desired distance which is identified by reference letter P in FIG. 1. That desired distance is generally equivalent to a function of the width W of the film resistor 14, the length L of the resistor body, the sheet resistivity $\rho_S$ of the resistor body 12, the desired resistance between connectors 18 and 20 and a geometry related constant F which describes the effects of the electric field fringing at the end of the cut made by the laser. Since the resistance between connectors 18 and 20 can be defined, as a function of the above described variables, according to the relationship $$R=(\rho_S L)/(W=F-P)$$

the relationship can be manipulated to yield the value of P as a function of the other variables as shown by $$P=W+F-\rho_S L/R$$

Since the laser begins at a position 10 at a distance X from the resistor body, the total movement of the laser beam is equal to distance X plus distance P minus one half of the diameter D of the laser beam. The predetermination of the amount of travel of the laser significantly improves the manufacturing time necessary to trim a film resistor. However, the improvement in manufacturing time is limited by the uncertainty of the accuracy of dimension X. Therefore, in a typical manufacturing procedure utilizing this technique, the laser is moved from point 10 in FIG. 1 to a location slightly less than its final position. This is done t avoid the possibility that dimension X is too small and would result in the laser moving too far into the body of the resistor during the trimming process. Since this type of error is not correctable, the more prudent technique utilizing this procedure is to intentionally undercut the trimming path, measure the actual resistance between connectors 18 and 20 and then make a final extension of the original trimming cut based on a recalculation of P after considering the resistance already achieved by the original trimming operation. This uncertainty with regard to the accuracy of location 10 and dimension X necessitates at least two separate trimming procedures.

The present invention provides a significant improvement over the techniques described above in association with FIG. 1. The resistor shown in FIG. 2 comprises a body 12 which originally is generally identical to the body 12 discussed above in relation to FIG. 1. In addition, connectors 18 and 20 are generally the same as those similarly identified in FIG. 1. However, as can clearly be seen by comparing FIGS. 1 and 2, the location of the cut 50 is located completely within the body 12 of the resistor 14 and is displaced a preselected distance from edges 16 and 54. As can also be seen in FIG. 2, the cut 50 does not intersect any edge of the resistor body 12.

To perform the operation of the present invention, distance P is calculated by the relationship $$P = W + 2F - \rho_S L/R$$

where the variables are the same as defined above. To accomplish the removal of material along the length P of the cut, the laser beam must travel a distance identified by Q in FIG. 2 where Q equals P minus D. The fringing factor geometric constant F is doubled in the above equation because of the existence of two edges, or termini, to the cut.

Figure 2:
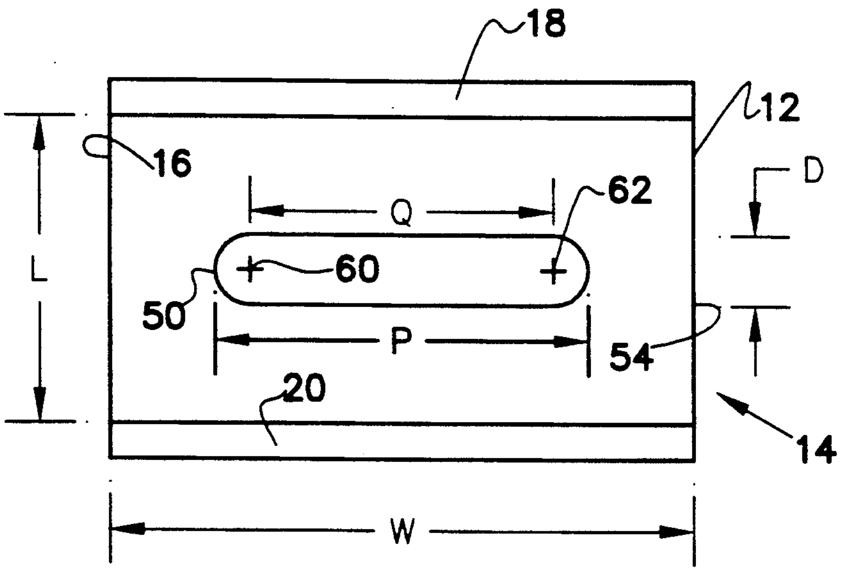
FIG. 2 shows a film resistor made in accordance with the techniques of the present invention.

The operation of the present invention begins with the placement of the laser beam, in a deenergized state, at the central point identified by reference numeral 60 in FIG. 2. It should be noted that position 60 is completely within the body 12 of the film resistor 14 and does not intersect any of the edges of the device. In addition, the location of point 60 is displaced a preselected distance away from the nearest edge. The laser is then energized while at point 60, and then moved toward the right for the distance identified by Q until it reaches point 62 which is also not in interfering relation with any edge of the body 12. After traveling the predetermined distance Q, the laser is deenergized and the resistor is removed from the trimming apparatus. Because of the elimination of distance X, identified above in association with FIG. 1, the present invention also eliminates the errors that could be cause by the lack of accuracy in the length of X and the initial location 10. Since the length of travel of the laser beam can be determined to a high degree of accuracy, the length Q will be highly accurate and will result in a resistance R between connectors 18 and 20 which is generally equal to the desired R that was used to calculate distance P and, therefore, distance Q. As can be seen, the present invention produces a resistor that is recognizable in comparison with that shown in FIG. 1 by the lack of interference between the cut 50, where the material was removed from the body 12, and any edge of the resistor body. The trimming operation of the present invention permits the entire trimming operation to be performed with one movement of the laser beam and one energization and one deenergization without the need for any intermediate measurements to be made to determine the resistance.

Although the present invention has been described in considerable detail and illustrated to describe its preferred embodiment, it should be understood that other embodiments of the present invention are within its scope.

The embodiments of the invention in which an exclusive property or right is claimed are defined as follows:

1. A method for trimming a film resistor, comprising:

positioning a laser at a first position with the beam direction of said laser aligned in interfering relation with a portion of the body of said film resistor;

energizing said laser to pierce a hole through said body of said film resistor, said hole being displaced from the edges of said body;

moving said laser beam from said first position to a second position while said laser remains energized, said second position being displaced from all edges of said body, said beams never intersecting any edge of said body while said laser is energized, said first and second positions being separated by a distance defined by $$Q = W + 2F - D - \rho_S L/R$$

where Q is the distance between said first and second positions, W is the width of said body, L is the length of said body, D is the effective diameter of said laser beam, R is the desired resistance of the film resistor, $\rho_S$ is the sheet resistivity of said body and F is a constant which relates to the geometry of said film resistor and describes the effect of electrical field fringing; and deenergizing said laser when said beam is disposed at said second position.

2. A film resistor made in accordance with the method of claim 1.

3. A method for trimming a resistor, comprising:

aligning a deenergized laser with a body of said resistor so that when the laser is energized the laser beam will intersect said body at a first position, said first position being displaced from all edges of said body;

energizing said laser to pierce a hole through said body at said first position;

moving said laser beams relative to said body, so that said laser beam intersects said body at a second position, said moving step being performed while said laser remains energized, resulting in the removal of an effected portion of said body between said first and second positions, said second position and said effected portion being displaced from all edges of said body, said first and second positions being separated by a distance defined by $$Q = W + 2F - D - \rho_S L/R$$

where Q is the distance between said first and second positions, W is the width of said body, L is the length of said body, D is the effective diameter of said laser beam, R is the desired resistance of the film resistor, $\rho_S$ is the sheet resistivity of said body and F is a constant which relates to the geometry of said film resistor and describes the effect of electrical field fringing; and deenergizing said laser after said laser beam has been moved from said first position to said second position.

4. The method of claim 3, wherein;

said resistor is a film resistor.

5. A resistor made in accordance with the method of claim 3.

6. A resistor made by a trimming process, comprising:

positioning a laser at a first position with the beam direction of said laser aligned in interfering relation with a portion of the body of a film resistor;

energizing said laser to pierce a hole through said body of said film resistor, said hole being displaced from the edges of said body;

moving said laser beam from said first position to a second position while said laser remains energized, said second position being displaced from all edges of said body, said beams never intersecting any edge of said body while said laser is energized, said first and second positions being separated by a distance defined by $$Q = W + 2F - D - \rho_S L / R$$

where Q is the distance between said first and second positions, W is the width of said body, L is the length of said body, D is the effective diameter of said laser beam, R is the desired resistance of the film resistor, $\rho_S$ is the sheet resistivity of said body and F is a constant which relates to the geometry of said film resistor and describes the effect of electrical field fringing; and deenergizing said laser when said beam is disposed at said second position.

* * * * *

UNITED STATES PATENT AND TRADEMARK OFFICE

CERTIFICATE OF CORRECTION

PATENT NO. : 5,262,615

DATED : November 16, 1993

INVENTOR(S) : Peter G. Hancock

It is certified that error appears in the above-indentified patent and that said Letters Patent is hereby corrected as shown below:

Column 6, line 55, cancel "beams" and substitute therefor --beam--.

Signed and Sealed this

Thirty-first Day of May, 1994

*Attest:*

BRUCE LEHMAN

*Attesting Officer*

*Commissioner of Patents and Trademarks*